(12) United States Patent
Alesiani et al.

(10) Patent No.: US 9,959,290 B2
(45) Date of Patent: May 1, 2018

(54) METHOD FOR THE CONTINUOUS PROCESSING OF TWO-LEVEL DATA ON A SYSTEM WITH A PLURALITY OF NODES

(71) Applicant: NEC EUROPE LTD., Heidelberg (DE)

(72) Inventors: Francesco Alesiani, Heidelberg (DE); Nitin Maslekar, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 326 days.

(21) Appl. No.: 14/895,930

(22) PCT Filed: Jun. 13, 2014

(86) PCT No.: PCT/EP2014/062451
§ 371 (c)(1),
(2) Date: Dec. 4, 2015

(87) PCT Pub. No.: WO2014/198937
PCT Pub. Date: Dec. 18, 2014

(65) Prior Publication Data
US 2016/0124992 A1    May 5, 2016

(30) Foreign Application Priority Data

Jun. 14, 2013 (EP) .................................... 13172112

(51) Int. Cl.
*G06F 17/00* (2006.01)
*G06F 17/30* (2006.01)
*G06F 9/50* (2006.01)

(52) U.S. Cl.
CPC ...... *G06F 17/30241* (2013.01); *G06F 9/5033* (2013.01); *G06F 17/30516* (2013.01); *G06F 17/30598* (2013.01)

(58) Field of Classification Search
CPC .... G06F 3/0683; G06F 3/0613; G06F 3/0685; G06F 3/0647; G06F 12/0646; G06F 3/0604
See application file for complete search history.

(56) References Cited

U.S. PATENT DOCUMENTS 8,386,715 B2    2/2013  Fischer
2013/0024479 A1  1/2013  Gong et al.

OTHER PUBLICATIONS

Markatos E P et al: "Using Processor Affinity in Loop Scheduling on Shared-Memory Multiprocessors", IEEE Transactions on Parallel and Distributed Systems, vol. 5, No. 4, Apr. 1, 1994 (Apr. 1, 1994), pp. 379-400, XP000439635.

(Continued)

*Primary Examiner* — Truong Vo
(74) *Attorney, Agent, or Firm* — Leydig, Voit & Mayer, Ltd.

(57) ABSTRACT

A method for continuous processing of two-level data on a system with a plurality of nodes for processing the data includes determining a system state representing at least one of actual or possible performance capabilities of the system, determining already processed data on the nodes, splitting and assigning high-level input data for processing with lower level data on one or more of the plurality of nodes according to the determined system state, processing requirements of the data and already processed data in a form of at least of lower level data on the nodes such that in case of the already processed data, data to be processed is compared with the already processed data, and input data is split and assigned to the plurality of nodes such that an amount of data to be exchanged for processing the input data on the respective nodes is minimized.

20 Claims, 6 Drawing Sheets

(56) References Cited

OTHER PUBLICATIONS

Subramaniam S et al: "Affinity scheduling of unbalanced workloads", Supercomputing '94., Nov. 14, 1994 (Nov. 14, 1994), pp. 214-226, XP010100480.
Chandra R et al: "Cool: An Object-Based Language for Parallel Programming"; computer; vol. 27; No. 8; Aug. 1, 1994 (Aug. 1, 1994), pp. 13-26, XP000469771.
"Data-Dependant Workload Balancing" IBM Technical Disclosure Bulletin, International Business Machines Corp., vol. 39, No. 1, Jan. 1, 1996 (Jan. 1, 1996), pp. 65-68, XP000556323.
W. Lu et al: "Decreasing FCD processing delay by deploying distributed processing system", Its Telecommunications Proceedings, 2006 6th International Conference on IEEE, Dec. 2006, pp. 206-209, XP31012398.
Z. Xiao et al: "A hierarchical approach to maximizing mapreduce efficiency", Parallel Architectures and Compilation Techniques (PACT), Dec. 2011, pp. 167-168, XP32083298.

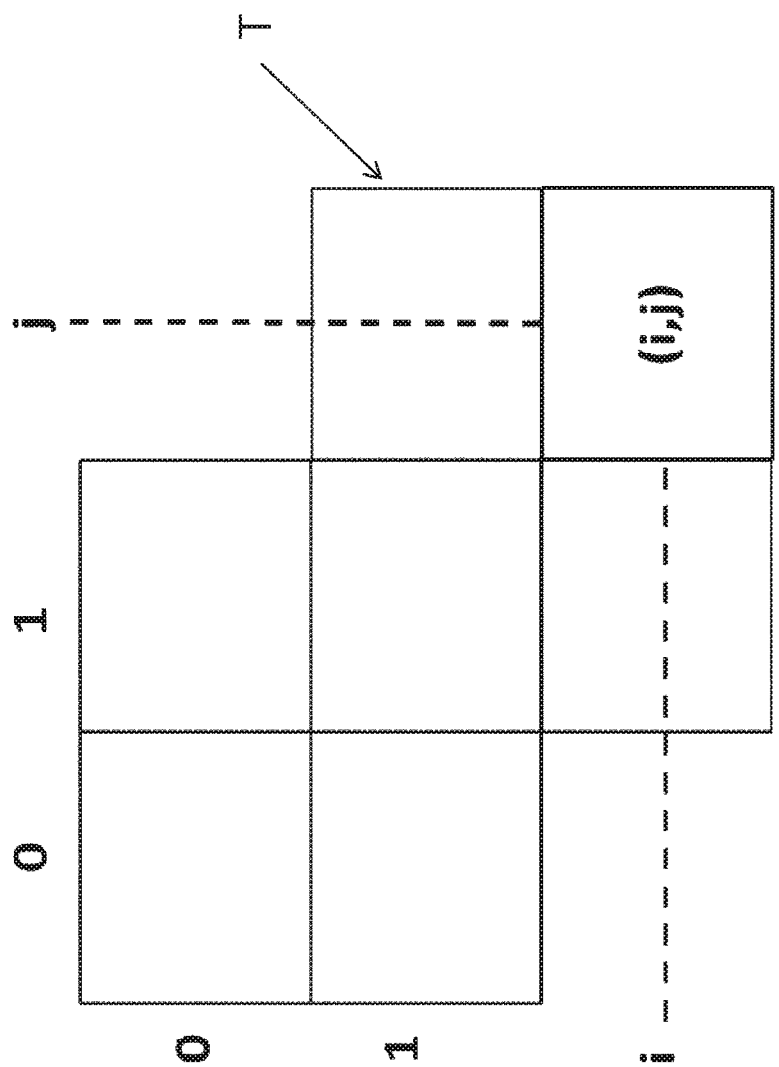

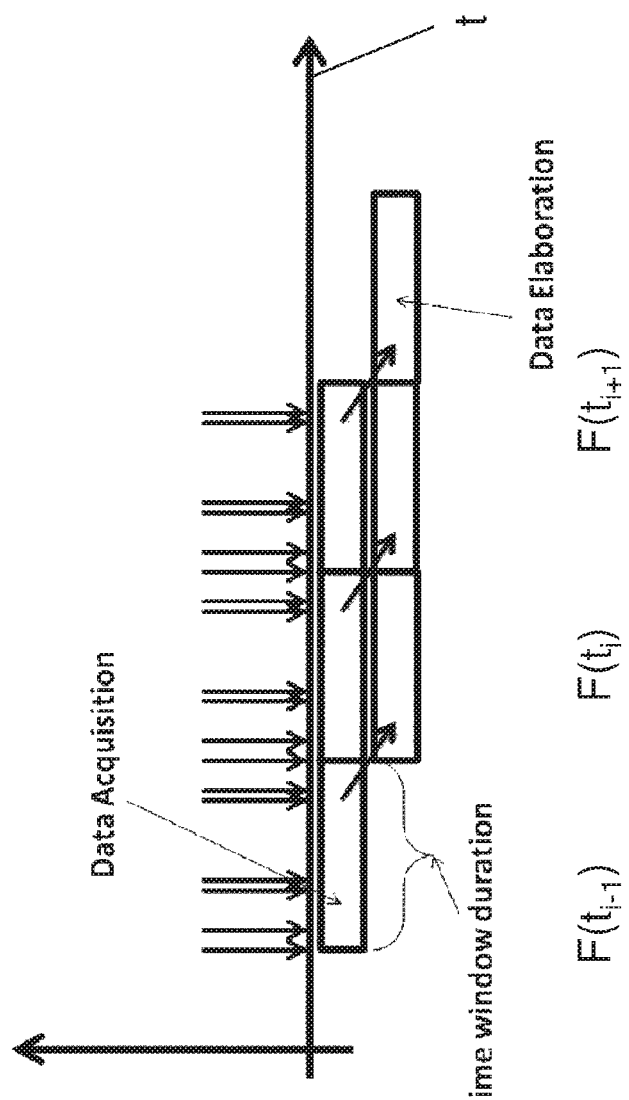

METHOD FOR THE CONTINUOUS PROCESSING OF TWO-LEVEL DATA ON A SYSTEM WITH A PLURALITY OF NODES

CROSS REFERENCE TO RELATED APPLICATIONS

This application is a U.S. National Stage application under 35 U.S.C. § 371 of International Application No. PCT/EP2014/062451 filed on Jun. 13, 2014, and claims benefit to European Patent Application No. EP 13172112.8 filed on Jun. 14, 2013. The International application was published in English on Dec. 18, 2014 as WO 2014/198937 A1 under PCT Article 21(2).

FIELD

The present invention relates to a method for continuous processing of two-level data on a system with a plurality of nodes for processing said data.

The present invention further relates to a system for continuous processing of two-level data.

The present invention even further relates to a node manager for managing continuous processing of two-level data by a plurality of nodes of a system for processing the data.

BACKGROUND

The analysis of large amounts of data has become more and more interesting due to the progress in computational power. One of the fields for an analysis of such "big data" is nowadays transportation: For example distributed sensors on handheld devices, vehicles, and roads can provide real-time traffic information that can be analyzed to improve transportation in general or in particular the traffic efficiency. Advances also in these data collecting technique models like induction, cellular sensing or the like have contributed to the abundance of geospatial data in urban traffic systems. Most of these urban traffic systems rely on so-called map-matching algorithms to predict the traffic situation in a geographic region, where the map represents roads, buildings or any content relevant elements.

These conventional map-matching algorithms depend on effective handling of near real-time traffic observation data which is usually very data-intensive. Such an intensive and continuous data stream as for example floating car data FCD causes, requires a rapid and parallel processing of the traffic data. Conventional systems based on map and reduce architectures distribute tasks to cope with large data sets. However, conventional distributed systems have the disadvantage that the transfer of information from one node to another node is limited and therefore represents one of the main bottlenecks. Conventional systems are therefore limited due to the time of accessing non-local information and/or memory access time.

In US 2013/0024479 A1 a method and system for processing a large data graph is shown using density-based processes which in turn use a map and reduce algorithm. In particular a density-based spatial clustering of applications with noise is shown using map-reduce as a model for acceleration of the clustering calculations of large graphs. The original graph is partitioned into a number of partial clustered graphs and each partition is processed on a respective node in a network system so that multiple partitions of the original graph are processed in parallel.

In U.S. Pat. No. 8,386,715 B2 a method and system for tile mapping is shown. In particular a method is shown in which a map with one or more tiles is requested. It is checked whether a tile object or a resource locator associated with the file object is stored in a cache and the tile object is then retrieved from the corresponding cache based on the resource locator.

In the non-patent literature of Rong Chen, Haibo Chen, and Binyu Zang, "Tiledmapreduce: optimizing resource usages of data-parallel applications on multicore with tiling", in Proceedings of the 19th international conference on Parallel architectures and compilation techniques, PACT, volume 10, pages 523-534, 2010 a tiled-map reduce method is shown. In particular a large map and reduce job is divided into a number of small subjobs and one subjob at a time is iteratively processed and the result of all subjobs is merged for output.

In the non-patent literature of Shin-Gyu Kim, Hyuck Han, Hyungsoo Jung, Hyeonsang Eom, and Heon Y Yeom, "Improving mapreduce performance by exploiting input redundancy", journal of information science and engineering, 27(3): 1137-1152, 2011 a method is shown for improving the performance of a map reduce algorithm using input redundancy. Data is cached if the same input file is read by different processes. This data is cached during the first access and then used from the caches subsequently. However, all data will be cached irrespective of its importance.

In the non-patent literature of Z. Xiao, H. Chen, and B. Zang, "A hierarchical approach to maximizing mapreduce efficiency" in Parallel Architectures and Compilation Techniques (PACT), 2011 International Conference on IEEE, 2011, pp. 167-168 a method to maximize mapreduce efficiency is shown. However the shown method suffers from the same problem, i.e. all data will be cached irrespective of its importance.

In the non-patent literature of the project "Memcached" available under http://memcached.org, data is cached based on a two level greedy method. Data is cached when requested by a node and further cached even if requested by another node. However, one of the problems is, that data is cached irrespective of its importance suffering the same problems as the methods mentioned above.

In the non-patent literature of Y. Zhao and J. Wu "Dache: A data aware caching for big-data applications using the mapreduce framework" a method is disclosed in which caching is based on the cached content. Intermediate results are stored based on the relevance of its content.

In the non-patent literature of W. Lu, W. Wand, K. Kimita, and T. Yokota "Decreasing FCD processing delay by deploying distributed processing system", in ITS Telecommunications Proceedings, 2006 6$^{th}$ International Conference on IEEE, 2006, pp. 206-209 floating a car data is loaded on multiple processors using a map and reduce method. No caching of maps is performed and hence for each data points the processors have to load maps from the disk memory.

In the non-patent literature of Q. Li, T. Zhang, and Y. Yu "Using cloud computing to process intensive floating car data for urban traffic surveillance", International Journal of Geographical Information Science, vol. 25, no. 8, pp. 1303-1322, 2011 a cloud based method is disclosed using a map-reduce algorithm for processing floating car data.

In the non-patent literature of F. Chen, M. Shen, and Y. Tang "Local path searching based map matching algorithm for floating car data", Procedia Environmental Sciences, vol.

10, pp. 576-582, 2011 a floating car data map-matching method is shown based on local path searching.

SUMMARY

According to an embodiment, a method is provided for continuous processing of two-level data on a system with a plurality of nodes for processing the data. The method includes determining a system state representing at least one of actual or possible performance capabilities of the system; determining already processed data on the nodes; splitting and assigning high-level input data for processing with lower level data on one or more of the plurality of nodes according to the determined system state, processing requirements of the data and already processed data in a form of at least of lower level data on the nodes such that in case of the already processed data, data to be processed is compared with the already processed data, and input data is split and assigned to the plurality of nodes such that an amount of data to be exchanged for processing the input data on the respective nodes is minimized; distributing the split input data to the one or more of the plurality of nodes for processing with the lower level data; and processing the distributed data on the one or more of the plurality of nodes.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 shows a data organization in tiles according to a third embodiment of the present invention;

FIG. 5 shows schematically steps of a part of a method according to a fourth embodiment of the present invention.

DETAILED DESCRIPTION

Figure 1:
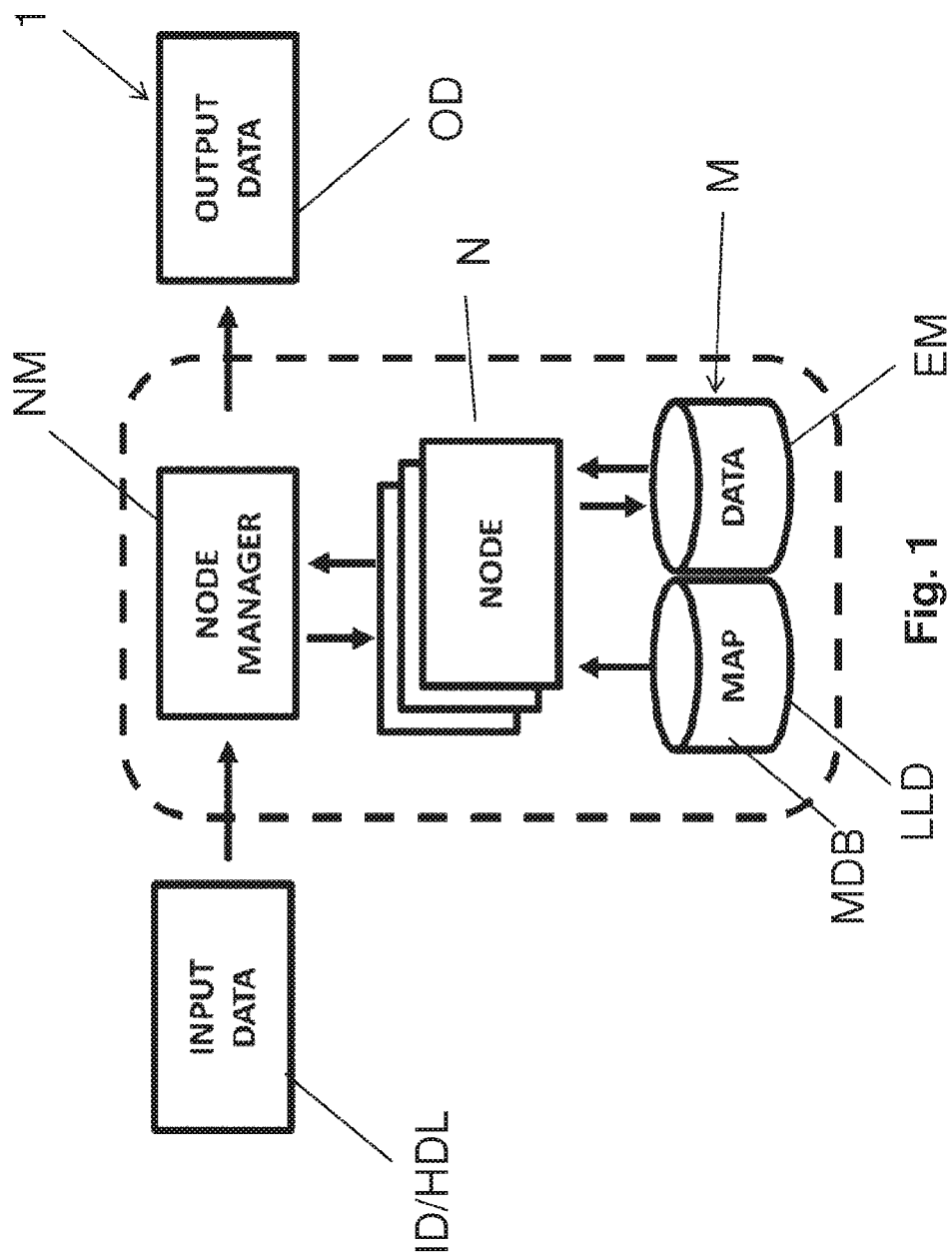
FIG. 1 shows a system according to a first embodiment of the present invention.

Although applicable to data in general, the present invention will be described with regard to geospatial data.

Although applicable to any kind of environment and usage in general, the present invention will be described with regard to transportation in general, in particular to traffic.

Conventional methods suffer from the problem that information has to be transferred from one node to another. In particular the time of accessing non-local information and/or memory access time is one of the main limiting factors.

The present invention provides a method and a system for processing data enabling an efficient processing of a continuous stream of data, in particular of geo-located data.

The present invention further provides a method and a system for processing data enabling the use of small processing units or nodes.

The present invention further provides a method and a system for processing data reducing the input/output for reading and writing data of nodes.

The present invention further provides a method and a method for processing data enabling a flexible handling of processed data.

The present invention further provides a method and a system for processing data which can be easily implemented.

According to an embodiment, a method for continuous processing of two-level data on a system with a plurality of nodes for processing said data is defined, preferably wherein data in a lower level is provided in form of geographical and/or spatial data.

According to an embodiment, a method is provided that is characterized by the steps of a) Determining a system state representing at least actual and/or possible performance capabilities of the system, preferably load on the nodes, b) Determining already processed data on the nodes, preferably data on the lower level, c) Splitting and assigning high level input data for processing with lower level data on one or more of the nodes according to the determined system state, processing requirements of the data, and already processed data in form of at least lower level data on the nodes such that in case of said already processed data, c1) the lower level data corresponding to the input data to be processed is compared with said already processed data, preferably on the lower level and c2) the input data is split and assigned to said nodes such that the amount of lower level data to be exchanged for processing the input data on the respective nodes is minimized, d) Distributing the split input data to said one or more nodes for processing with said corresponding lower level data, and e) Processing the distributed data on said one or more nodes.

According to an embodiment, a node manager for managing continuous processing of two-level data by a plurality of nodes of a system for processing the data is defined, preferably wherein data in a lower level is provided in form of geographical and/or spatial data.

According to an embodiment, a node manager is provided that is characterized in that the node manager is operable to provide one or more rules for splitting and assigning high level input data for processing with lower level data on one or more of the nodes according to a determined system state, processing requirements of the data, and already processed data in form of at least lower level data on the nodes such that in case of said already processed data, c1) the lower level data corresponding to the input data to be processed is compared with said already processed data, preferably on the lower level and c2) the input data is split and assigned to said nodes such that the amount of lower level data to be exchanged for processing the input data on the respective nodes is minimized, According to an embodiment, a system for continuous processing of two-level data is defined that includes a plurality of nodes for processing the data, preferably wherein data on a lower level is provided in form of geographical and/or spatial data, and a node manager.

According to an embodiment of the invention, it has been recognized that a faster processing of two level data, in particular with geo-located data for vehicular traffic data analysis, is enabled.

According to an embodiment of the invention it has been further recognized that cost efficiency is enhanced, in particular small processing units, nodes or the like can be used.

According to an embodiment of the invention it has been even further recognized that memory access either global or external can be reduced when reading and writing in particular geographic and/or spatial data by nodes.

According to an embodiment of the invention it has been even further recognized that saving of elaborated or processed data can be delayed when an access to an external memory is not required.

According to an embodiment of the invention it has been further recognized that by using underlying data, i.e. the low level data and linked data, i.e. input data as high level data with the underlying data, for example the velocity of a car, an efficient splitting and assigning is possible, since for example when the linked data is processed on the same underlying spatial data on the same node reloading of the underlying low level data, i.e. here the map data, can be reduced. Thus, efficiency and performance is enhanced. The node manager does not have to actively split the data, but at least defines rules for splitting. Each node may access split and assigned data independently from another node and/or one or more separate entities may send the split and assigned data to the respective nodes.

According to an embodiment of the invention it has been further recognized that an enhanced resource management is enabled, in particular in terms of load balancing allowing a lower maximum load peak and a higher efficiency, in particular by enabling a lower number of nodes required for processing.

In other words, an embodiment of the present invention provides a distributed processing system which may be used in connection with a map and reduce algorithm and which may comprise elaboration nodes with a limited computing power. Input data is assigned to processors considering a correlation among data, i.e. high level input data is linked to low level map data, avoiding unnecessary accesses for example to a database or the like to load low level data for processing. In particular in case of geospatial data and traffic data analysis like estimating a traffic situation, etc. can be performed at a much improved rate.

The term "load" can refer to processing load and/or memory load. The processing load refers to the amount of processing power required to a single elaboration unit or node with respect to its maximum processing power which may be expressed as percentage. Processing load over the attributed node implies that the processor requires more unit of time to complete a computational task. Memory load refers to the percentage of load of the local memory with information necessary for processing a computational task. The amount of memory is preferably mainly used for map data and is not dependent on the size of input data. When information necessary for computation by a node or elaboration unit is not present in the local memory it will be transferred from an external global memory.

According to a further preferred embodiment the lower-level data is subdivided into tiles, wherein the tiles cover the full lower-level data, preferably wherein part of the tiles and/or all tiles partially overlap. This further enhances the efficiency, since an efficient subdivision of geographical data in a projected mapping as well as computation can be provided. If the tiles preferably partially overlap, then a continuous processing over tiles can be provided.

According to a further preferred embodiment the tiles are organized hierarchically, wherein the higher tile level corresponds to smaller tiles and a lower tile level corresponds to larger tiles. This ensures an efficient processing since for example tiles can be subdivided adapted to a memory capacity of a node so that an efficient processing and an efficient memory usage of tiles on different nodes is enabled.

According to a further preferred embodiment the load on one or more of the nodes is checked and when the load exceeds a predetermined threshold, preferably wherein the threshold is set to the maximum possible load, then one or more other nodes are searched with lesser load for performing steps c)-e). This avoids that a node is overloaded while other nodes are in idle mode. Thus, a waist of computational resources is avoided enabling efficient processing of the data.

According to a further preferred embodiment the input data is provided in form of geographical content defined by location information, preferably wherein said location information is represented by geographical coordinates. If the input data is provided in form of geographical content, in particular defined by location information a very efficient processing of geospatial data is possible. Another advantage is that the method can in particular be used for efficient processing of traffic data or traffic prediction.

According to a further preferred embodiment the tiles are provided by a subdivided latitude and/or longitude values of geographical data. This allows a simple definition of the tiles and thus an efficient processing.

According to a further preferred embodiment prior to at least step c) the input data is acquired and transformed for performing the steps c)-e). Therefore also data can be processed which in turn is for example due to its original structure not suitable for processing on a distributed system. For example the original data may be analysed with regard to information, elements or the like which can be processed later in parallel on different nodes and the corresponding information may be used during splitting and assigning of the data to different nodes for processing.

According to a further preferred embodiment the input data to be processed is grouped in time slots for step-by-step processing of the input data with the corresponding low level data. This allows a handling in particular of big-data or large data amounts which occur for example in traffic scenarios for predicting traffic movement or the like.

According to a further preferred embodiment processed input data from different nodes is combined and/or reduced and/or aggregated at a higher tile level. This enables for example to use a map and reduce algorithm. Further flexibility is enhanced, since an aggregation or combination of data from different nodes is possible.

According to a further preferred embodiment storing the processed data after step e) in a global memory is delayed if processed data of a memory of a node has to be removed for loading new input data for processing. This enables to delay the saving of elaborated data when memory access for example is not required.

According to a further preferred embodiment for step a) a load on one or more nodes is predicted by extrapolating the difference between actual processed high level data and past processed high level data and/or by using movement information and orientation information of actual processed high level data. This enables for example to predict the load in the next time slot if a computation of the future processing load is not desirable or needs to much computational resources.

When for example movement information and orientation information are available, for example speed and angle information of a vehicle, then for example new coordinates of that vehicle at a future time point can be calculated and therefore also the underlying low level data may be determined.

According to a further preferred embodiment for initiation the input data is split among the nodes without performing steps b), c1) and c2) and within the constraints of processing limit and memory limit of the corresponding node. This ensures an efficient initiation for performing steps a)-e), so that none of the nodes is used beyond its performance capacities.

According to a further preferred embodiment when the input data cannot be split without violating at least one of the constraints the input data is uniformly split among all nodes. This enables that a violation of constraints does not overload one single node. Therefore when a current processor cannot host more input data another processor is selected until the process is finished and if the entire data set cannot be assigned without violating one of the constraints then it will be assigned in a uniform way to all processors ensuring a continuous processing of the data.

FIG. 1 shows a system according to a first embodiment of the present invention.

In FIG. 1 the system 1 receives input data ID in form of high level data HLD and transmits the received input data ID a node manager NM. The node manager NM splits, assigns and transmits the parts of the split input data ID to nodes N for processing. Each of the nodes N may communicate with a map database MDB providing low level data LLD in form of map data and further with an external storage EM wherein the reference sign M is used as global memory for both, for caching or swapping processed data. After processing the data each node N sends its result back to the node manager NM. The node manager NM then combines the results from the different nodes N and outputs the data as output data OD.

Figure 2:
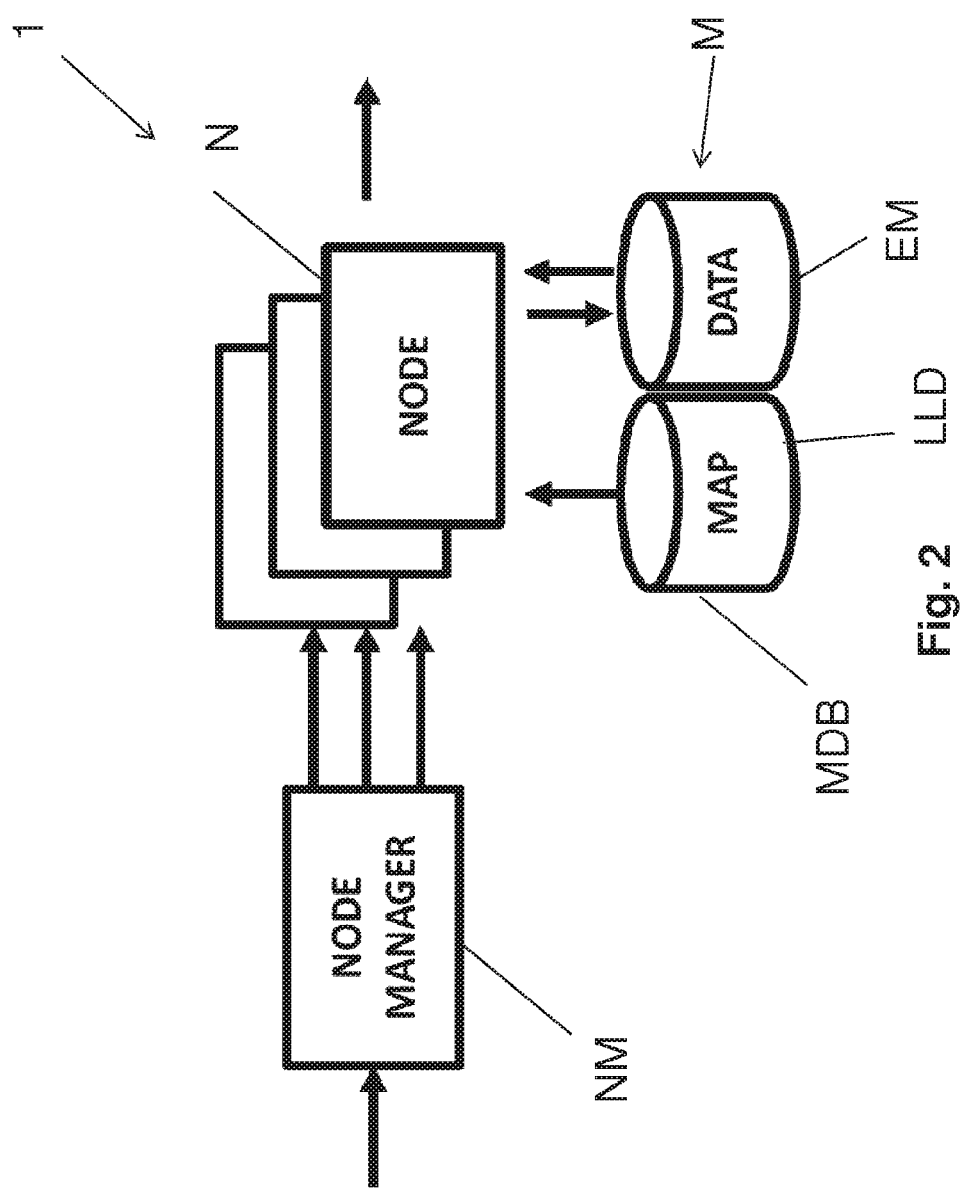
FIG. 2 shows the system of FIG. 1 in more detail.

FIG. 2 shows a system of FIG. 1 in more detail.

In FIG. 2 a processing architecture of a system according to the invention is shown.

The system 1 comprises multiple elaboration nodes N, one or more node managers NM, which may also called data splitters, and a global memory M, here in form of a map database MDB and external memory EM being accessible by all nodes N. In the map database MDB multiple information may be stored like map data LLD representing a road structure and other static information associated to it. The information stored in the database MDB may be organized in tiles that have a geographical meaning and represent geographical areas.

Each node N may be equipped additionally with local memory allowing processing of input data ID. When elaboration of input data ID requires some map data LLD and this data LLD is not present in the local memory of the node N then the global memory M is accessed. If map data LLD to be loaded does not fit into the local memory of the node N some data is removed from the local memory and stored in the global memory M requiring a memory swap or in general a memory access.

The input data ID may include vehicular traffic data comprising geographical information and other attributes and the output data OD comprises elaborated vehicular traffic data with geographical information. To divide or split the initial data ID the load on the respective nodes N is considered. If a maximum load on the nodes N is exceeded then other less loaded nodes N are tried to be found which are already processing the same geographical data. Whenever a processing node N has to elaborate geo-located data and the relevant map data LLD is not present in the local memory of the corresponding node N the relevant map data LLD is loaded into the local memory of the corresponding node N. Then in a second phase after having processed the input data ID a reassignment of the geographical area to a different node N is minimized, i.e. the shift of geographical area node N needs to work on is minimized. Thus, the number of global memory accesses is minimized.

The term "load" refers to processing load and memory load. The processing load refers to the amount of processing power required to a single elaboration unit or node N with respect to its maximum processing power which may be expressed as percentage. Processing load over the attributed node N implies that the processor requires more unit of time to complete a computational task.

Memory load refers to the percentage of load of the local memory with information necessary for processing a computational task. The amount of memory is preferably mainly used for map data, i.e. tile information of the database MDB and is not dependent on the size of input data ID. When information necessary for computation by a node or elaboration unit N is not present in the local memory it will be transferred from an external global memory M. This requires transferring the information from the external global memory M to the local memory imposing delay and communication overhead in the overall processing task or task elaboration.

The input data ID preferably represents geographical content defined by one or more location information. The location information itself can be represented in geographical coordinates, for example latitude and longitude values or already referred to an underlying map structure by some identification of the element of the corresponding map or map tile. The input data ID may be attributed by further information like time and state of the source of the information or the like. Input data ID may be provided by a basic data unit with its location and attributes representing a physical phenomenon such as a movement of a vehicle or some aggregated traffic information or the like.

Figures 3A, 3B:
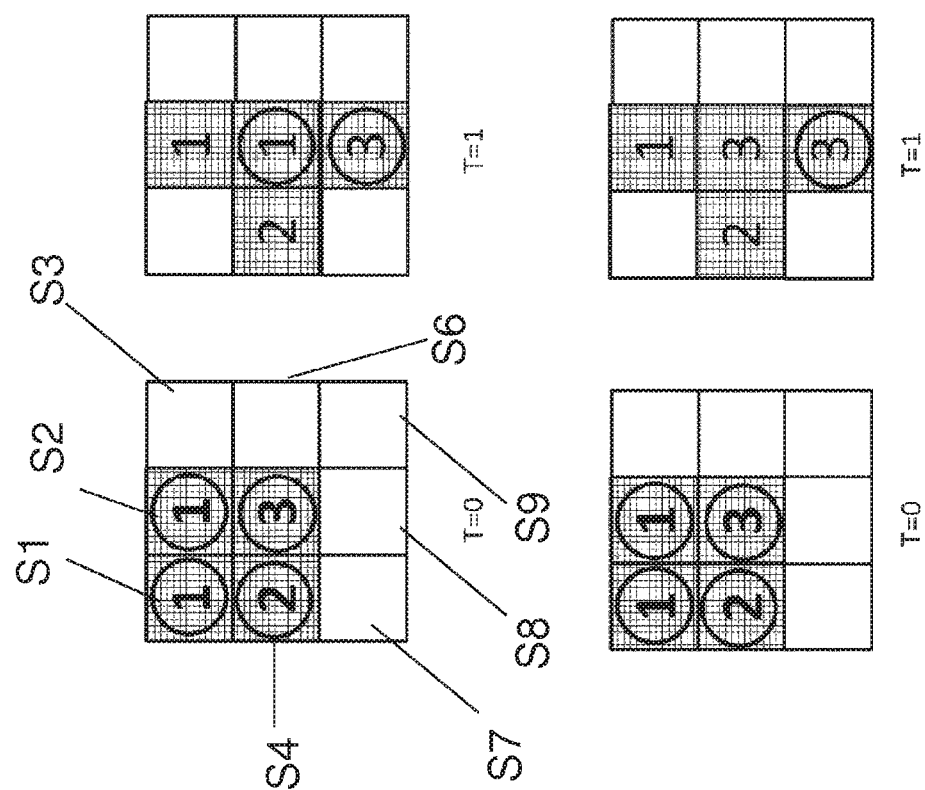
FIG. 3*a* shows a conventional method for processing data.
FIG. 3*b* shows a performance of a method for different time points according to a second embodiment of the present invention.

FIG. 3a shows a performance of a conventional method for processing data. FIG. 3b shows a performance of a method for different time points according to a second embodiment of the present invention.

In FIGS. 3a and 3b two examples of input data assignment is shown where the numbers in the respective figures represent the corresponding processors and the squares the geographical areas. Circles show map loading operations prior to processing the map dada with the input data ID.

In FIG. 3a at a time index T=0 the first processor loads map data for the tiles S1 and S2 and processes it. The second processor loads map data for tile S4 and the third processor loads map data for tile S5. This is identical for FIG. 3b and represents that in the initial step the nodes have to load data at all for processing.

For the next time index T=1 the first processor now processes tiles S2 and S5 wherein tile S5 has to be loaded into the memory of the first processor. The second processor further performs on tile S4 and the third processor has to process map data corresponding to tile S8 and therefore has to load the corresponding map data for tile S8 into its memory.

In FIG. 3b at the same time index T=1 the third processor instead of the first processor in FIG. 3a processes map data for tile S5 since at the time index T=0 the third processor has already loaded the corresponding map data for tile S5 into its memory. Therefore in FIG. 3b at the time index T=1 the third processor only loads the map data for tile S8 into its memory for processing.

At the time index T=2 in FIG. 3a the third processor now loads map data for tile S4 into its memory for processing, the second processor loads map data for tile S7 into its memory for processing and the first processor loads map data for tile S8 into its memory for processing. However, in FIG. 3b in the next time index T=2 only the first processor has to reload map data for tile S7 for processing whereas the second and third processor already have the corresponding map data for the tiles S4 and S8 respectively. Therefore FIG. 3b shows a better assignment of data to be processed: The time steps T=1 and T=2 according to FIG. 3a shows five load operations in total while FIG. 3b shows only two time operations for T>0.

FIG. 4 shows a data organization in tiles according to a third embodiment of the present invention.

In FIG. 4 tiles of a tile system T are shown representing the geographical information. For example a geographical area of interest may be divided into smaller regions, i.e. the tiles. These tiles may comprise of geographical area information that may partially overlap. The set of all tiles then covers the whole geographical area of interest. The tiles may be organized in a hierarchical structure or levels where smaller tiles are included in larger tiles. Higher tile levels correspond to smaller tiles. Preferably the tiles are defined as successive subdivision of latitude and longitude value ranges. Tiles at the same tile level do not have a common area. Of course other subdivisions are also possible. In FIG. 4 indices i, j allow a precise identification of the tiles covering the whole geographical area of interest.

FIG. 5 shows schematically steps of a part of a method according to a fourth embodiment of the present invention.

In FIG. 5 the elaboration process for data is shown. The vertical arrows denote new data appearing at the "entrance" of the system within a certain time window $F(t_{i-1})$, $F(t_i)$ or $F(t_{i+1})$. After the data acquisition for example in the time window $F(t_{i-1})$, the in the next time slot or time window $F(t_i)$ the data elaboration is performed. Therefore data elaboration lags the time period of a time window duration: When data is acquired within the time window $F(t_{i+1})$ the data elaboration is performed in the next time window $F(t_{i+2})$.

Therefore FIGS. 2-5 show part of the following processing steps: In the data acquisition phase the data is acquired by conventional acquisition methods. The data is transformed into a format tractable by the system. Any sort of communication with external entities may be performed for performing this step.

Data time windowing then enables that the input data can be grouped into time slots, for example as shown in FIG. 5. After that the input data ID is split among the elaboration units or nodes N by the node manager NM. The node manager NM has rules for splitting the input data ID.

Once the input data ID has been split among the nodes N the actual processing of input data ID is performed. Processing uses the spatial elaboration and map data in case of geographical or geospatial data.

Optionally the processed data from different nodes N is reduced or aggregated to a higher level. When the processed data is aggregated at a higher level, only a summarized overview of the processed data is available at the higher level. For example when the processed data comprises vehicles travelling on different tiles of a map, an aggregation of this processed data to a higher level may show a list of vehicles present in the tiles and their velocity and direction.

Finally the processed data is output, for example either is then stored, sent to an external entity or stored in a database. When the processed data is saved in the global, i.e. non-local memory, this process can be delayed if there is no memory release, i.e. when the data from the local memory of any node N needs to be removed to load other map data.

In detail and with regard to all FIG. 1-6, the node manager NM imposes a splitting function for assigning and splitting the data:

$$w^t_{kl} \in [0,1]$$

represents the percentage of input data belonging to the l-th tile and assigned to the k-th processor in the t-th time window.

At each time step, the new assignment matrix can be considered as an update of the previous matrix:

$$W^t = W^{t-1} + \Delta W^t$$

The memory access operations are related to the update assignment matrix. When an entry is positive implies that a new tile needs to be loaded, when the entry is negative means that the tile can be released, while when the entry is zero no change in the local memory is required.

In the following the following quantities are used:
$x^t = (x^t_1, \ldots, x^t_K)^T$: is a vector containing the number of input data per processor
$z^t = (z^t_1, \ldots, z^t_L)^T$: is a vector containing the number of data per tile
$y^t = (y^t_1, \ldots, y^t_K)^T$: is a vector containing the number of tile per processor where K is the total number of processors and L is the total number of tiles.

The distribution of the input data to the processor (x) depends on the input data distribution per tile (z) and the assignment matrix (W) as defined by:

$$x^t = W^t z^t$$

The assignment of the processing load on the units is based on the actual processing request defined by $z^t$. Alternatively, if computing $z^t$ directly is not desirable, the same information can be approximated using two methods:

1) Based on the information received at the current time step t, the position of the point in the next time step is predicted, where $x_{it}$, $y_{it}$ are the coordinates of i-th input data at time t:

$$x_{i,t+1} = 2x_{it} - x_{it-1} \qquad (1)$$

$$y_{i,t+1} = 2y_{it} - y_{it-1} \qquad (2)$$

2) Alternatively, when the speed and angle information are available ($v_{i,t}$, $\alpha_{i,t}$) the next position can be approximated by $$x_{i,t+1} = x_{it} + v_i \delta t \sin \alpha_{it} \qquad (3)$$

$$y_{i,t+1} = y_{it} + v_i \delta t \cos \alpha_{it} \qquad (4)$$

It is possible to formulate the general problem of defining the splitting function as an optimization problem $$\min \Delta W_{s.t.} \qquad (5)$$

$$1^T 1_{cov} 1 \qquad (65)$$

$$x^{t+1} \leq p \qquad (7)$$

$$1^T \Delta W \geq 1^T - 1^T W^t \qquad (8)$$

$$1_w 1_L \leq m \qquad (9)$$

where the vector m and P represent the memory and processing limits, while $I_{\Delta w}$ is the matrix with 1 if the entry is not 0, 0 otherwise.

In the following the solution to the previous problem is described. The hard constraints in (9) and (7) can be relaxed and included in the minimization cost (5).

For initialization of the system 1 in particular for assigning the input data for processing on one or more nodes, the number of memory accesses is not considered when defining a first assignment. This assignment may be preferably provided in form of an assignment matrix. The assignment matrix iterates on all tiles such that for each tile a maximum number of data points belonging to that tile is assigned to the less loaded processes without violating constrains of processing and memory limits.

When the current selected node cannot host more input data ID another node or processor N is chosen until all data is assigned. If the entire input data ID cannot be assigned without violating the processor and memory constraints it will be assigned in a uniform way to all processors.

The following procedure is an example for such an assignment:

```
Input: predicted or computed next load z_l^{t+1};
processor and memory limits P_k, M_k;
number of processors K
Output: allocation w_kl
1   for l ∈ (1, ..., L) do
2   |  while z_l > 0 do
3   |  |  for k ∈ (1, ..., K) do
4   |  |  |  δ = min{P_k, x_k + z_l} − x_k;
5   |  |  |  if δ > 0, y_k < M_k then
6   |  |  |  |  w'_kl+ = δ
7   |  |  |  |  z_l− = δ;
8   |  |  |  end
9   |  |  end
10  |  end
11  |  w_kl = normalize (w'_kl)
12  end
```

After having generated the assignment matrix in a previous time step an update matrix for this assignment matrix is computed. Preferably this is obtained by modifying the previous assignment matrix with a minimum number of operations in order to avoid overloading the memory processor and simultaneously minimizing the memory access. The previous or first assignment matrix is first applied to new input data ID. If the assignment matrix causes a violation of processing power constraint of one or more of the nodes N then the input data ID causing the violation is assigned to a node N with less processing load. This process is iterated as long as all processes do not violate a maximum processing power of the respective node.

In the following the corresponding procedure is shown:

```
Input: predicted or computed next load z^{t+1};
previous allocation matrix W^t;
weighting parameter β
Output: new allocation that minimize modification
1   set W = W^t;
2   define z = z^{t+1};
3   compute q = Wz − p;
4   compute r = 1_w1 − m;
5   while some condition do
6   |  select k = arg max_k r_k;
7   |  if r_k ≤ 0 then
8   |  |  end
9   |  end
10  |  select tile that is used most, there may be chances
```

```
        that its load can be shared;
11  |  compute l(k) = arg max_l Σ_{k−1,wk1} > 0^K 1;
12  |  select k'(k) = arg min_{k'} r_{k'} + β_{qk'} where
       |  qk' < 0, r_{k'} < 0 and w_{k'l(k)} > 0;
13  |  select k'' (k) = arg min_{k'} r_{k'} + β_{qk'} where
       |  q_{k'} < 0, r_{k'} < 0;
14  |  if k'(k) exists then
15  |  |  update δw = min(w_kl, 1 − w_{k'l});
16  |  |  update w_kl = w_kl − δw;
17  |  |  update w_{k'l} = w_{k'l} + δw;
18  |  |  compute q = Wz − p;
19  |  end
```

The above mentioned procedure does not direct or reduce memory usage of a node when a current allocation of memory exceeds on some node N the available local memory space.

In the following a procedure for allocation of input data ID is shown so that the memory limit of a node N is respected. The input data ID is assigned to a node/processing unit N already processing same tile:

```
Input: predicted or computed next load z^{t+1};
previous allocation matrix W^t;
weighting parameter α
Output: new allocation that minimize modification
1   set W = W^t;
2   define z = z^{t+1};
3   compute q = Wz − p;
4   compute r = 1_w1 − m;
5   while some condition do
6   |  select k = arg max_k q_k;
7   |  if q_k ≤ 0 then
8   |  |  end
9   |  end
10  |  (option I) compute l(k) = arg max_l w_kl z_l;
11  |  (option II) compute l(k) = arg min_l w_kl z_l, where
       |  w_kl z_l − q_k ≥ 0;
12  |  select k'(k) = arg min_{k'} q_{k'} + αr_{k'} where
       |  w_{k'l(k)} > 0 and r_{k'} ≤ m_{k'}, q_k + q_{k'} ≤ 0 ;
13  |  select k''(k) = arg min_{k''} q_{k''} + αr_{k''}, where
       |  r_{k''} + 1_{w k''l − 0} ≤ m_{k''}, q_k + q_{k''} ≤ 0;
14  |  if k'(k) exists then
15  |  |  update δw = min(w_kl, q_k/z_{l(k)});
16  |  |  update w_kl = w_kl − δw;
17  |  |  update w_{k'l} = w_{k'l} + δw;
18  |  |  compute q = Wz − p;
19  |  end
20  |  else if k''(k) exists then
21  |  |  update δw = min(w_kl, q_k/z_{l(k)});
22  |  |  update w_kl = w_kl − δw;
23  |  |  update w_{k''l} = w_{k''l} − δw;
24  |  |  compute q = wz − p;
25  |  end
26  |  else
27  |  |  end
28  |  end
29  end
```

Figure 6:
FIG. 6 shows used test data for performing with a method according to a fifth embodiment of the present invention.

FIG. 6 shows used test data for performing with a method according to a fifth embodiment of the present invention.

In FIG. 6 test data in form of floating car data FCD was used. The used Floating car data FCD includes position, time direction and speed of around 11.000 taxis travelling in Wuhan, China. A sample of this is shown in the present FIG. 6.

For computations a tile system is generated by dividing the longitude and latitude of a globe by two at each tile level. Tile levels used in the simulations are between 12 and 17. Level 14 represents roughly an area of 2 km×2 km. The simulations consider K=30 processors, maximum processing capability per processor $P_k$=500, wherein the processing power unit is the one, needed to elaborate one input point and max tiles per processor is considered Mk=100.

| Parameter | Symbol | Values |
|---|---|---|
| Num. Processors | K | 30 |
| Max processing capacity | $P_K$ | 500 |
| Max tile per processor | $M_K$ | 100 |
| Tile levels | — | 12-17 |

The simulations were performed with time windows of size 60 s, 30 s, 20 s and 10 s. For 60 s and 10 s windows, at different tile levels, the number of points is shown in the Table 1 and Table 2, where "SUM" is the total number of points, "AVG" is the average number of points per tile, "90%" and "10%" are the number of points per tile at the two percentile levels.

TABLE 1

60 s time-window, number of points per tile

| Indicator | 12 | 13 | 14 | 15 | 16 | 17 |
|---|---|---|---|---|---|---|
| tilesize (SUM) | 10714 | 10714 | 10714 | 10714 | 10714 | 10714 |
| tilesize (AVG) | 209 | 104 | 48 | 21 | 10 | 5 |
| tilesize (90%) | 525 | 346 | 158 | 63 | 26 | 12 |
| tilesize (10%) | 1 | 1 | 1 | 1 | 1 | 1 |

TABLE 2

10 s time-window, number of points per tile

| Indicator | 12 | 13 | 14 | 15 | 16 | 17 |
|---|---|---|---|---|---|---|
| tilesize (SUM) | 1932 | 1932 | 1932 | 1932 | 1932 | 1932 |
| tilesize (AVG) | 67 | 32 | 14 | 6 | 3 | 2 |
| tilesize (90%) | 168 | 85 | 40 | 16 | 7 | 4 |
| tilesize (10%) | 1 | 1 | 1 | 1 | 1 | 1 |

Performances are reported considering the following indicators:

processor overload (proc): the percentage of the processors that are overloaded, i.e. that $x_k > P_k$ out of memory (proc): the percentage of the processors that are out of memory, i.e. that $y_k > M_k$ leaving (total): averaged number of tiles that are removed in the current time step t with respect to the ones present in the previous time step $t_{i-1}$ entering (total): averaged number of tiles that are new in the current time step leaving (proc): averaged number of tiles that leave a processor entering (proc): averaged number of tiles that enter a processor kept (proc): averaged number of tiles that stay in a processor in two consecutive time steps proc use (proc): averaged processor load against the maximum allowed $x_k/P_k$ mem use (proc): averaged memory usage $y_k/M_k$ Three methods are evaluated:

A) Method A: is the method composed of all the three algorithms,

B) Method B: is the method that only apply the initial assignment matrix at each iteration, C) Method C: is the method that uses a hash function on the spatial tile identification string as the splitting function. This function allows to balance processing load among the processing units Table 3 and Table 4 show the performance results. The shown embodiments of the invention have a performance similar to a hash function for processor usage (100% vs 75%), but have a better memory use (7% vs 67%) and tiles are kept in the single processor with higher probability (88% vs 7%) for tile level 12 and time window of 60 s. Similar results hold for different tile level and time window size.

TABLE 3

60 s time window, simulation results

| Indicator | Method | 12 | 13 | 14 | 15 | 16 | 17 |
|---|---|---|---|---|---|---|---|
| processor overload (tile) | A | 0% | 0% | 0% | 0% | 0% | 0% |
| processor overload (tile) | B | 0% | 0% | 0% | 0% | 0% | 0% |
| Processor overload (tile) | C | 0% | 0% | 0% | 0% | 0% | 0% |
| out of memory (tile) | A | 0% | 0% | 0% | 0% | 0% | 0% |
| out of memory (tile) | B | 0% | 0% | 0% | 0% | 0% | 0% |
| out of memory (tile) | C | 0% | 0% | 0% | 100% | 100% | 100% |
| leaving (total) | Total | 6% | 10% | 16% | 19% | 22% | 27% |
| entering (total) | Total | 71% | 71% | 71% | 71% | 71% | 71% |
| leaving (proc) | A | 12% | 14% | 17% | 19% | 22% | 27% |
| entering (proc) | A | 6% | 11% | 16% | 19% | 22% | 27% |
| kept (proc) | A | 88% | 86% | 83% | 81% | 78% | 73% |
| proc use (proc) | A | 100% | 100% | 100% | 100% | 93% | 87% |
| mem use (proc) | A | 7% | 15% | 26% | 41% | 50% | 57% |
| leaving (proc) | B | 92% | 95% | 97% | 97% | 97% | 98% |
| entering (proc) | B | 6% | 11% | 16% | 19% | 22% | 27% |
| kept (proc) | B | 8% | 5% | 3% | 3% | 3% | 2% |
| proc use (proc) | B | 100% | 100% | 100% | 100% | 94% | 87% |
| mem use (proc) | B | 3% | 11% | 24% | 40% | 51% | 57% |
| leaving (proc) | C | 93% | 95% | 96% | 97% | 97% | 97% |
| entering (proc) | C | 6% | 11% | 16% | 19% | 22% | 27% |
| kept (proc) | C | 7% | 5% | 4% | 3% | 3% | 3% |

TABLE 3-continued 60 s time window, simulation results

| Indicator | Method | 12 | 13 | 14 | 15 | 16 | 17 |
|---|---|---|---|---|---|---|---|
| proc use (proc) | C | 75% | 76% | 75% | 76% | 75% | 75% |
| mem use (proc) | C | 67% | 69% | 68% | 67% | 68% | 68% |

TABLE 4

10 s time-window simulation result

| Indicator | Method | 12 | 13 | 14 | 15 | 16 | 17 |
|---|---|---|---|---|---|---|---|
| Processor overload (proc) | A | 0% | 0% | 0% | 0% | 0% | 0% |
| processor overload (proc) | B | 0% | 0% | 0% | 0% | 0% | 0% |
| processor overload (proc) | C | 0% | 0% | 0% | 0% | 0% | 0% |
| out of memory (proc) | A | 0% | 0% | 0% | 0% | 0% | 0% |
| out of memory (proc) | B | 0% | 0% | 0% | 0% | 0% | 0% |
| out of memory (proc) | C | 0% | 0% | 0% | 0% | 0% | 0% |
| leaving (total) | Total | 31% | 28% | 25% | 25% | 30% | 46% |
| entering (total) | Total | 13% | 13% | 13% | 13% | 13% | 13% |
| leaving (proc) | A | 31% | 29% | 25% | 25% | 30% | 46% |
| entering (proc) | A | 31% | 28% | 25% | 25% | 30% | 46% |
| kept (proc) | A | 69% | 71% | 75% | 75% | 70% | 54% |
| proc use (proc) | A | 54% | 37% | 27% | 21% | 18% | 16% |
| mem use (proc) | A | 0% | 0% | 2% | 6% | 8% | 10% |
| leaving (proc) | B | 98% | 98% | 98% | 97% | 98% | 98% |
| entering (proc) | B | 31% | 28% | 25% | 25% | 30% | 46% |
| kept (proc) | B | 2% | 2% | 2% | 3% | 2% | 2% |
| proc use (proc) | B | 54% | 37% | 27% | 21% | 18% | 16% |
| mem use (proc) | B | 0% | 0% | 2% | 6% | 8% | 10% |
| leaving (proc) | C | 96% | 97% | 97% | 97% | 97% | 98% |
| entering (proc) | C | 31% | 28% | 25% | 25% | 30% | 46% |
| kept (proc) | C | 4% | 3% | 3% | 3% | 3% | 2% |
| proc use (proc) | C | 15% | 14% | 14% | 15% | 15% | 15% |
| mem use (proc) | C | 12% | 12% | 11% | 11% | 11% | 11% |

The following conclusions of the performed simulations can be drawn:
- the percentage of tiles that are kept between two consecutive time steps in a processor passes from 3-4% (hash split function) to 83% (with the proposed method) at 14-th tile level with the proposed algorithm, reducing memory access of ca 20×(2000%)
- since hash splitting function does not consider memory allocation, it shows 100% of out-of-memory situation, i.e. requiring memory swap within the single time step, for tile level from 15
- memory usage is considerably reduced, especially for smaller tile levels.

In summary an embodiment of the present invention preferably provides a method and a system for splitting spatial data for vehicular traffic data analysis and map-matching maximizing a geographic correlation between the data assignments.

An embodiment of the present invention further enables a definition of a processing and memory model in a time-windowed scenario allowing an evaluation of requirements for external memory access and splitting of data assignment in two phases, i.e. an initial load assignment and an update load assignment.

An embodiment of the present invention further enables a definition of an initial split of data considering the overall processing memory capability of a single processing unit or node respectively. Preferably in random order each processor iteratively allocates a part of a computational task wherein this is continued up to a completion of the assignment of the required processing tasks.

An embodiment of the present invention even further provides two mechanisms for updated a load assignment considering processing and memory capabilities of a single processor or node respectively and update and assignment in order to minimize map area changes.

An embodiment of the present invention further enables to predict the next time window load considering that input data has some form of inertia given by the previous state values.

An embodiment of the present invention has inter alia the following advantages: The present invention enables a fast geo-located data processing for vehicular traffic data analysis.

Further an embodiment of the present invention enables the use of small processing units which are cheap.

Even further an embodiment of the present invention reduces global or external memory access both in reading and writing of geographic and/or spatial data.

Even further an embodiment of the present invention enables to delay the saving of elaborated data when memory access is not required. The present invention allows reducing an access to external memories when processing geo-located data while keeping same performance in terms of processing in memory balancing.

Even further an embodiment of the present invention enables an enhanced resource management, in particular in terms of load balancing allowing a lower maximum load peak and a higher efficiency, in particular by enabling a lower number of nodes required for processing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for continuous processing of two-level data on a system with a plurality of nodes for processing the data, the method comprising:
 a) determining a system state representing at least one of actual or possible performance capabilities of the system,
 b) determining already processed data on the nodes,
 c) splitting and assigning high-level input data for processing with lower level data on one or more of the plurality of nodes according to the determined system state, processing requirements of the data and already processed data in a form of at least of lower level data on the nodes such that in case of the already processed data,
  c1) data to be processed is compared with the already processed data, and
  c2) input data is split and assigned to the plurality of nodes such that an amount of data to be exchanged for processing the input data on the respective nodes is minimized,
 d) distributing the split input data to the one or more of the plurality of nodes for processing with the lower level data, and
 e) processing the distributed data on the one or more of the plurality of nodes.

2. The method according to claim 1, wherein the lower level data is subdivided into tiles, and
 wherein the tiles cover the full lower-level data.

3. The method according to claim 2, wherein the tiles are organized hierarchically, and
 wherein a higher tile level corresponds to smaller tiles and a lower tile level corresponds to larger tiles.

4. The method according claim 2, wherein the tiles are provided by at least one of subdivided latitude or longitude values of geographical data.

5. The method according to claim 2, wherein at least one of a part of the tiles or all of the tiles partially overlap.

6. The method according to claim 1, wherein a load on one or more of the nodes is checked and when the load exceeds a predetermined threshold, one or more other nodes are searched with lesser load for performing steps c)-e).

7. The method according to claim 6, wherein the threshold is set to the maximum possible load.

8. The method according to claim 1, wherein the input data is provided in a form of geographical content defined by location information.

9. The method according to claim 8, wherein the location information is represented by geographical coordinates.

10. The method according to claim 1, wherein prior to at least step c), the input data is acquired and transformed for performing the steps c)-e).

11. The method according to claim 1, wherein the input data to be processed is grouped in time slots ($t_{i-1}$, $t_i$, $t_{i+1}$) for step-by-step processing of the input data with the corresponding lower level data.

12. The method according to claim 1, characterized in that processed input data from different nodes is at least one of combined, reduced, or aggregated at a higher tile level.

13. The method according to claim 1, wherein storing the processed data after step e) in a global memory is delayed if processed data of a memory of a node has to be removed for loading new data for processing.

14. The method according to claim 1, wherein for step a) a load on one or more nodes is predicted by at least one of:
 extrapolating the difference between actual processed high level data and past processed high level data, and
 by using movement information and orientation information of actual processed high level data.

15. The method according to claim 1, wherein for initiation, the input data is split among the nodes without performing steps b), c1) and c2) and within the constraints of processing limit and memory limit of the corresponding node.

16. The method according to claim 15, wherein when the input data cannot be split without violating at least one of the constraints the input data is uniformly split among all nodes.

17. The method according to claim 1, wherein data in a lower level of the two-level data is provided in a form of geographical and/or spatial data.

18. The method according to claim 1, wherein the system state representing at least one of actual or possible performance capabilities of the system is a load on the nodes,
 wherein the already processed data on the nodes is data on a lower level of the two-level data, and
 wherein the data to be processed is compared with the already processed data lower level data.

19. A node manager for managing continuous processing of two-level data by a plurality of nodes of a system for processing the data, the node manager being operable to:
 provide one or more rules for splitting and assigning high-level input data for processing with lower level data on one or more of the nodes according to a determined system state, processing requirements of the data, and already processed data in form of at least of lower level data on the nodes such that in case of said already processed data,
  c1) the data to be processed is compared with the already processed data, and
  c2) the input data is split and assigned to the nodes such that the amount of data to be exchanged for processing the input data on the respective nodes is minimized.

20. A system for continuous processing of two-level data the system comprising:
 a plurality of nodes for processing the data, and
 a node manager being operable to provide one or more rules for splitting and assigning high-level input data for processing with lower level data on one or more of the nodes according to a determined system state, processing requirements of the data, and already processed data in form of at least of lower level data on the nodes such that in case of said already processed data,
  c1) the data to be processed is compared with the already processed data, and
  c2) the input data is split and assigned to said nodes such that the amount of data to be exchanged for processing the input data on the respective nodes is minimized.

* * * * *